United States Patent
Zikeli et al.

[11] Patent Number: 5,656,224
[45] Date of Patent: Aug. 12, 1997

[54] PROCESS FOR THE PRODUCTION OF A CELLULOSE SUSPENSION

[75] Inventors: Stefan Zikeli, Regau; Peter Hinterholzer, Schörfling, both of Austria

[73] Assignee: Lenzing Aktiengesellschaft, Austria

[21] Appl. No.: 465,314

[22] Filed: Jun. 5, 1995

[30] Foreign Application Priority Data

Apr. 19, 1995 [AT] Austria ......... 673/95

[51] Int. Cl.$^6$ ............ B29C 47/00; D01F 2/02
[52] U.S. Cl. ............ 264/207; 106/200.2; 106/200.3; 162/70; 162/81
[58] Field of Search ............ 264/207; 162/70, 162/81; 106/203, 200.2, 200.3

[56] References Cited

U.S. PATENT DOCUMENTS

| | | | |
|---|---|---|---|
| 4,246,221 | 1/1981 | McCorsley, III | 264/203 |
| 4,416,698 | 11/1983 | McCorsley, III | 106/163.1 |

FOREIGN PATENT DOCUMENTS

| | | |
|---|---|---|
| 356419 | 2/1990 | European Pat. Off. |
| 553070 | 1/1993 | European Pat. Off. |
| 2011493 | 10/1970 | Germany |
| 226573 | 8/1985 | Germany |
| WO93-19230 | 9/1993 | WIPO |
| WO94-06530 | 3/1994 | WIPO |
| WO94-28217 | 12/1994 | WIPO |
| WO95-07811 | 3/1995 | WIPO |

*Primary Examiner*—Leo B. Tentoni
*Attorney, Agent, or Firm*—Brumbaugh, Graves, Donohue & Paymond

[57] ABSTRACT

The invention is concerned with a process for the production of a suspension of cellulose in a liquid, aqueous tertiary amine-oxide, wherein shredded cellulose is mixed with the liquid, aqueous tertiary amine-oxide, said process comprising:

(A) contacting the shredded cellulose with the liquid, aqueous tertiary amine-oxide, a first mixture being prepared, and (B) spreading this first mixture mechanically as a layer on a surface and transporting it along this surface while intensively being mixed, until a homogeneous suspension is produced which is removed from the surface, wherein (C) measures (A) and (B) are carried out continuously.

13 Claims, 1 Drawing Sheet

PROCESS FOR THE PRODUCTION OF A CELLULOSE SUSPENSION

BACKGROUND OF THE INVENTION

The present invention is concerned with a process for the production of a suspension of cellulose in a tertiary amine-oxide which is present in liquid state, as well as a process for the production of cellulose moulded bodies such as films, fibres and membranes.

For some decades there has been searched for processes for the production of cellulose moulded bodies able to substitute the viscose process, today widely employed. As an alternative which is interesting among other reasons for its reduced environmental impact, it has been found to dissolve cellulose without derivatisation in an organic solvent and extrude from this solution moulded bodies, e.g. fibres, films and membranes. Fibres thus extruded have received by BISFA (The International Bureau for the Standardization of man made fibers) the generic name Lyocell. By an organic solvent, BISFA understands a mixture of an organic chemical and water.

It has turned out that as an organic solvent, a mixture of a tertiary amine-oxide and water is particularly appropiate for the production of cellulose moulded bodies. As the amine-oxide, primarily N-methylmorpholine-N-oxide (NMMO) is used. Other amine-oxides are described e.g. in EP-A - 0 553 070. A process for the production of mouldable cellulose solutions is known e.g. from EP-A - 0 356 419.

In U.S. Pat. No. 4,246,221, an amine-oxide process for the production of spinnable cellulose solutions using as starting material, among other substances, a mixture of cellulose in liquid, aqueous N-methylmorpholine-N-oxide (NMMO) is described. According to this process, a suspension of cellulose in the aqueous amine-oxide solution is prepared in a discontinuously operating mixing device, the mixture being simultaneously heated at reduced pressure, while water is withdrawn and a first solution prepared, which after filtration and post-processing in an extruder is transformed into a mouldable solution. A disadvantage of this known process is the discontinuous preparation of the cellulose suspension in the mixer. This discontinuous initial step makes the amine-oxide process as a whole discontinuous, which is disadvantageous, since any moulding process such as spinning to fibres is best carried out continuously.

From WO 94/28217, a process for the production of a premixture based on cellulose, wherefrom a mouldable cellulose solution may be prepared, is known. According to this process, shredded cellulose and an amine-oxide solution are introduced into a horizontal cylindrical mixing chamber with a rotor having axially spaced stirring elements. The mixture is stirred in the mixing chamber by rotating the rotor at a rate of from 40 to 80 revolutions per minute. Preferably, the mixture in the mixing chamber is kept at a temperature of above 65° C. This process however has the following drawbacks:

1. The process is very time-consuming, since among other things the amine-oxide solution and the cellulose cannot be introduced into the mixing chamber at once, but must be introduced one after the other.
2. Another drawback of the process consists in that it may be carried out only discontinuously, each batch requiring approximately 21 minutes.
3. Due to the discontinuous operation, two such mixers must be operated in order to deliver the cellulose/amine-oxide mixture continuously to a device wherein the cellulose solution is produced and continuously delivered to e.g. a spinning machine.
4. The use of two mixers implies that every device such as storing tanks, conducts, pumps, filters etc. provided between the mixers and the spinning machine must also be present twice, evidently involving a considerable additional technical and financial effort.
5. Another drawback lies in the fact that relatively big amounts of amine-oxide are processed per batch. These big amounts imply a safety risk, since tertiary amine-oxides are unstable and tend to decompose at elevated temperature.
6. Moreover, discountinuously operated mixers are difficult to empty.

SUMMARY OF THE INVENTION

Thus it is the object of the present invention to provide a process not exhibiting the drawbacks mentioned above, according to which a homogeneous cellulose suspension may be produced in a single step and at a high rate from shredded cellulose and an aqueous amine-oxide solution, which homogeneous cellulose suspension can be as a starting material for the amine-oxide process.

The process according to the invention for the production of a suspension of cellulose in a liquid, aqueous tertiary amine-oxide, wherein shredded cellulose is mixed with the liquid, aqueous tertiary amine-oxide, is characterized in that (A) said shredded cellulose is contacted with the liquid, aqueous tertiary amine-oxide, a first mixture being prepared, and (B) this first mixture is spread mechanically as a layer on a surface and transported along this surface while intensively being mixed, until a homogeneous suspension is produced which is removed from the surface, (C) measures (A) and (B) being carried out continuously.

The invention is based on the finding that by employing the film technique, particularly the thin-film technique, a homogeneous cellulose suspension may be produced in a simple and rapid way.

Furthermore, it has been shown that in the process according to the invention it is also readily possible to add homogeneously, together with the cellulose, auxiliary agents such as stabilizers, dispersants, auxiliary spinning agents, reactivity-improving reagents, incorporation media of an inorganic or organic nature (barite, activated carbon, $SiO_2$, CMC, modifiers (polyethyleneglycoles) and other polymers such as nylon; dyes. This is of decisive importance for these auxiliary agents to develop their maximum effect. Furthermore, it has been shown that such an addition does not slow down the production of the homogeneous suspension.

Another advantage of the process according to the invention consists in that as the liquid, aqueous tertiary amine-oxide wherein the shredded cellulose is suspended, an aqueous solution of the tertiary amine-oxide which is liquid at room temperature and a molten tertiary amine-oxide hydrate may be employed.

In the process according to the invention, a liquid, aqueous tertiary amine-oxide having a temperature in the range of from 50° to 85° C. is preferably employed.

According to the process according to the invention, the cellulose is transported along the surface preferably during a time perid of from 1 to 5 minutes. This means that the cellulose suspension is obtained in a homogeneous form and in a continuous way already within a few minutes. Thus the process according to the invention represents a considerable simplification of the amine-oxide process.

The invention is also concerned with the use of a device for carrying out the process according to the invention having an indirectly heatable or coolable vessel provided with a stirring element, said vessel being a cylindrical vessel provided with a centrally arranged rotor having stirring elements attached thereto, said stirring elements having an inclination angle α towards the axis of the rotor for mixing and transporting the cellulose contacted with the liquid aqueous tertiary amine-oxide, the radial distance of the stirring elements to the internal wall of the vessel amounting to not more than 20 mm and inlets for the shredded cellulose and the liquid aqueous tertiary amine-oxide being provided in the upper part of the vessel and an outlet for the homogeneous suspension being provided in the lower part of the vessel.

Preferably, a device wherein the inclination angle α is adjustable is used.

The invention is further concerned with a process for the production of a mouldable cellulose solution, characterized in that a homogeneous suspension produced according to the process according to the invention is transformed into a mouldable cellulose solution while water is evaporated. The production of the cellulose solution is conveniently carried out in a thin-film treatment apparatus. Such a process is described for instance in EP-A - 0 356 419. An embodiment of a thin-film treatment apparatus is for instance a so-called FILMTRUDER®, as made by the company Buss AG (Switzerland). A thin-film treatment apparatus is also described in DE-OS 2 011 493.

WO 94/06530 published in 1994 uses the thin-film technique known from EP-A - 0 356 419 to obtain a mouldable solution from a mixture of cellulose in an aqueous solution of a tertiary amine-oxide. The process is carried out in a FILMTRUDER®, analogously to an embodiment described in EP-A 0 356 419. The process of WO 94/06530 has as its object to save energy, and to solve this object it proposes to rotate the rotor more slowly.

Further, the present invention is concerned with a process for the production of cellulose moulded bodies consisting in the transformation of a cellulose suspension produced according to the invention into a mouldable cellulose solution, which subsequently is processed into films, fibres, membranes or other moulded bodies in a substantially known way.

By means of a dosing apparatus, the suspension prepared according to the invention may be fed directly to the FILMTRUDER®, therein being transformed into a solution. A degassing extruder is also appropiate for preparing the solution. In the latter case however, the suspension must be present in concentrated state, since a degassing extruder has only a very reduced evaporation capacity. The suspension prepared according to the invention may be transformed into the cellulose solution also by means of other devices. Further, before being transformed into the solution, the suspension may be additionally subjected to a grinding step.

BRIEF DESCRIPTION OF THE DRAWINGS

By means of the attached drawing, a device wherein the process according to the invention may be carried out in a particularly appropiate way is described.

DETAILED DESCRIPTION OF THE PREFERRED EMBODIMENTS

Figure 1:
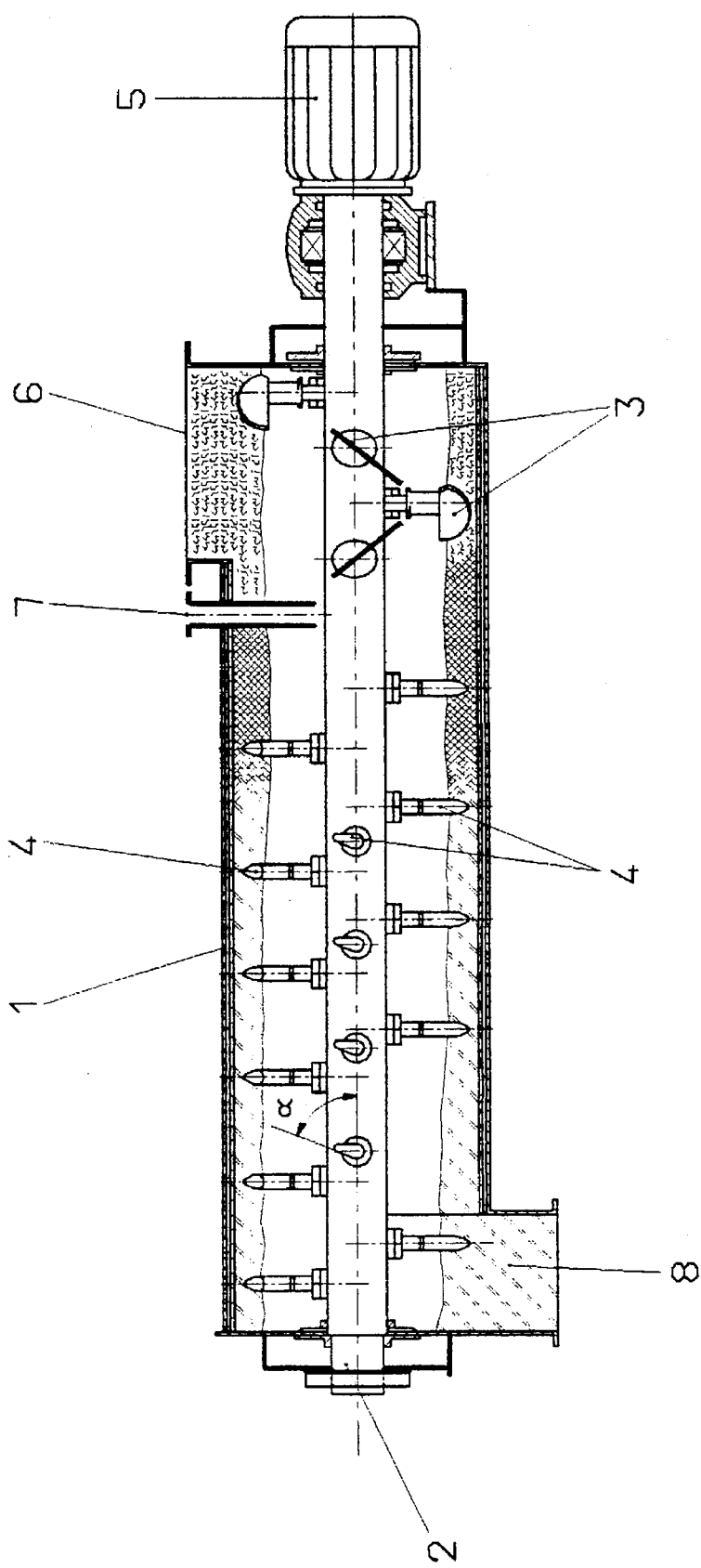
FIG. 1 shows a cross-sectional side view of a mixing device in accordance with the invention. Such mixers are commercialized for instance as ring layer mixer by the company Draiswerke GmbH, Mannheim, Germany, under the name K-TT.

FIG. 1 schematically shows a longitudinal section of a horizontally mounted mixer, consisting substantially of a cylindrical vessel 1 having a double jacket for indirect heating or cooling of the material to be processed, a rotor 2 centrally arranged within the vessel 1 and having transport blades 3 and spiniform elements 4 attached thereto. Rotor 2 is driven by means of a motor 5.

The shredded cellulose is introduced into the cylindrical vessel 1 through inlet 6, seized by the transport blades 3 and transported into the interior of vessel 1, rotor 2 being rotated so rapidly that the shredded cellulose, due to centrifugal force, is thrown by the transport blades to the cylindrical wall of the vessel, therein being transported as a layer into the interior of vessel 1.

The liquid, aqueous amine-oxide solution is fed to the vessel through inlet pipe 7. Inlet pipe 7 extends nearly to rotor 2 and is disposed in a gap between neighbouring transport blades and spiniform elements, so that the rotation of rotor 2 is not impeded. Due to the centrifugal force conferred to the amine-oxide solution, it is thrown radially outwards, first wetting the cellulose, a mixture being formed. This wetting state is represented in the Figure by section lines. Depending on the intensity of the mixing and the ratio of amine-oxide solution to cellulose, during the transport of the mixture along the wall of vessel 1 a homogeneous suspension is formed, which is removed through aperture 8 and may be used for the production of the cellulose solution either immediately or after a subsequent processing, such as a grinding step.

The spiniform elements 4 are somewhat inclined towards the axis of rotor 2, thus being able to pass on the suspension. It is important that the rotor is rotated at such a high rate that the cellulose/amine-oxide mixture is thrown to the vessel wall, forming a layer thereon. If the radius of the vessel is for instance 15 cm, an exemplary revolution number of the rotor to form a layer is about 700 revolutions per minute.

By means of the following Example, the invention will be illustrated in more detail.

EXAMPLE

For the preparation of the suspension, a so-called ring layer mixer K-TT 80 (made of stainless steel) of the company Draiswerke GmbH, Mannheim, Germany, was used. The function mode of this mixer is described above by means of the drawing.

To the ring layer mixer, 55 kg of shredded cellulose per hour having a particle size of not more than 4 mm and 375 kg of an aqueous solution containing 75% by mass of NMMO were continuously fed. As a heating medium, water having a temperature of 75° C. was employed. In the ring layer mixer, normal pressure prevailed. The rotor was rotated at 700 revolutions per minute.

Per hour, 430 kg of homogeneous suspension having a dry substance density of 12,8% by mass of cellulose and a temperature of 65° C. could be obtained from the ring layer mixer.

The suspension produced in the ring layer mixer was fed to a FILMTRUDER® of the Buss HS 0200 type according to the process described in EP-A - 0 356 419 at a rate of 430 kg/h and a temperature of 75° C., therein being transformed into a mouldable solution having a cellulose concentration of 15,0%. The heating surface of the FILMTRUDER® was heated by means of saturated vapor at 142° C. The circumferential rate of the rotor was 4 m/s and the pressure in the filmtruder was 50 mbar. Approximately 63 kg of water vapor per hour were withdrawn.

Using the above process parameters, approximately 367 kg per hour of mouldable cellulose solution having a temperature of 105° C. could be removed from the filmtruder.

The mouldable solution obtained did not contain any undissolved cellulose particles (microscopical analysis), was degassed and could be easily processed into fibres and films by means of the process known from WO 93/19230 and WO 95/07811 respectively of the applicant.

The residence time of the cellulose in the ring layer mixer was 2 minutes. This means that using the process according to the invention it is possible to produce in only a few minutes a homogeneous suspension from the starting materials cellulose and amine-oxide solution, which can be easily transformed into a mouldable cellulose solution.

We claim:

1. A process for the production of a homogeneous cellulose suspension comprising the steps of:

providing an elongated surface, having an input end and an output end;

continuously contacting shredded cellulose with a liquid aqueous tertiary amine-oxide to form a first mixture;

mechanically spreading said first mixture as a layer on said elongated surface;

transporting said mechanically spread first mixture along said elongated surface;

intensively mixing said first mixture until a homogeneous cellulose suspension is produced; and continuously removing said homogeneous cellulose suspension from the output end of said elongated surface.

2. A process according to claim 1, wherein said liquid is an aqueous solution of tertiary amine-oxide.

3. A process according to claim 1, wherein said liquid is a molten, tertiary amine-oxide hydrate.

4. A process according to claims 2 or 3, wherein said liquid is at a temperature in the range of 50° to 85° C..

5. A process according to claims 2, 3 or 1, wherein the cellulose contacted with the liquid is transported along the surface for a time interval of 1 to 5 minutes.

6. A method of preparing a suspension of cellulose in a liquid, aqueous tertiary amine-oxide using an apparatus comprising an indirectly heatable or coolable vessel provided with a stirring device and inlet means in the upper part of the vessel, said vessel being a cylindrical vessel provided with a centrally arranged rotor with stirring elements attached thereto, said stirring elements having an inclination angle α to the axis of the rotor, the radial distance of the stirring elements to the internal wall of the vessel being not more than 20 mm, and an outlet means at the lower part of the vessel, said method comprising the steps of:

continuously contacting shredded cellulose with the liquid, aqueous tertiary amine-oxide to form a first mixture;

continuously rotating the rotor to cause the stirring elements to spread the first mixture as a layer on the inner surface of the cylindrical vessel and transport the first mixture along the surface of the cylindrical vessel while mixing the first mixture; and continuously discharging the resultant suspension of cellulose in a liquid, aqueous tertiary amine-oxide from the outlet means.

7. A process according to claim 4, wherein the cellulose contacted with the liquid is transported along the surface for a time interval of 1 to 5 minutes.

8. The process according to claims 2, 3 or 1, further comprising the step of forming a mouldable cellulose solution from the homogeneous suspension while evaporating water from the suspension.

9. A process according to claim 8, wherein said mouldable cellulose solution is formed in a thin-film treatment apparatus.

10. A process according to claim 8, wherein said mouldable cellulose solution is processed into films, fibres, membranes or other moulded bodies.

11. A method according to claim 7, wherein the inclination angle α is adjustable.

12. A method according to claim 7, wherein said liquid is a liquid, aqueous tertiary amine-oxide.

13. A method according to claim 7, wherein said liquid is a molten, tertiary amine-oxide hydrate.

* * * * *

UNITED STATES PATENT AND TRADEMARK OFFICE
CERTIFICATE OF CORRECTION

PATENT NO. : 5,656,224
DATED : August 12, 1997
INVENTOR(S) : Stefan Zikeli, et al.

It is certified that error appears in the above-identified patent and that said Letters Patent is hereby corrected as shown below:

Column 3, line 25, "instace" should read --instance--; and,

Column 6, claim 10, line 3, "or other" should read --or--

Signed and Sealed this

Second Day of December, 1997

BRUCE LEHMAN

Attest:

Attesting Officer

Commissioner of Patents and Trademarks